(12) United States Patent
Vaisman et al.

(10) Patent No.: US 10,364,744 B2
(45) Date of Patent: Jul. 30, 2019

(54) DEEP HEAT RECOVERY GAS TURBINE ENGINE

(71) Applicants: Rolls-Royce Corporation, Indianapolis, IN (US); Rolls-Royce North American Technologies Inc., Indianapolis, IN (US)

(72) Inventors: Igor Vaisman, Carmel, IN (US); Michael James Armstrong, Avon, IN (US); Thomas E. Bastnagel, Danville, IN (US)

(73) Assignees: Rolls-Royce Corporation, Indianapolis, IN (US); Rolls-Royce North American Technologies Inc., Indianapolis, IN (US)

( * ) Notice: Subject to any disclaimer, the term of this patent is extended or adjusted under 35 U.S.C. 154(b) by 137 days.

(21) Appl. No.: 15/457,789

(22) Filed: Mar. 13, 2017

(65) Prior Publication Data

US 2017/0356340 A1    Dec. 14, 2017

Related U.S. Application Data

(60) Provisional application No. 62/347,430, filed on Jun. 8, 2016.

(51) Int. Cl.
*F02C 6/18* (2006.01)
*F02C 7/10* (2006.01)
(Continued)

(52) U.S. Cl.
CPC ............... *F02C 6/18* (2013.01); *F01D 15/12* (2013.01); *F02C 1/007* (2013.01); *F02C 1/04* (2013.01);
(Continued)

(58) Field of Classification Search
CPC .... F02C 1/007; F02C 1/04; F02C 1/10; F02C 6/18; F02C 7/08; F02C 7/10
See application file for complete search history.

(56) References Cited

U.S. PATENT DOCUMENTS

| 4,498,289 A | 2/1985 | Osgerby |
| 2013/0096629 A1 | 4/2013 | Rollinghoff et al. |

(Continued)

FOREIGN PATENT DOCUMENTS

| EP | 2952726 A1 | 12/2015 |
| WO | WO 2014/158244 A2 | 10/2014 |

OTHER PUBLICATIONS

European Office Action, issued in corresponding European Patent Application No. 17170539.5, dated Nov. 28, 2018, pp. 1-5, European Patent Office, Rijswijk, Netherlands.

(Continued)

*Primary Examiner* — Scott J Walthour
(74) *Attorney, Agent, or Firm* — Brinks Gilson & Lione (57) ABSTRACT

A gas turbine engine may include a deep heat recovery system, such as a deep heat recovery super critical carbon dioxide (sCO2) system. The deep heat recovery system may include two-stage cooling of the working fluid (such as carbon dioxide—CO2) where at least one of cooling stages is recuperative by transferring heat from the working fluid to a flow of compressed air being supplied to a combustor included in the gas turbine engine. The deep heat recovery system may operate in a supercritical cycle, or in a transcritical cycle depending on the temperature to which the working fluid is cooled during a second stage of the two-stage cooling. The second stage of the two-stage cooling includes working fluid-to-air heat rejection where the air is ambient air.

20 Claims, 5 Drawing Sheets

(51) Int. Cl.
*F01D 15/12* (2006.01)
*F02C 1/04* (2006.01)
*F02C 3/04* (2006.01)
*F02K 3/06* (2006.01)
*F25B 9/00* (2006.01)
*F25B 9/06* (2006.01)
*F02C 1/00* (2006.01)
*F02C 1/10* (2006.01)
*F02C 7/08* (2006.01)

(52) U.S. Cl.
CPC ............... *F02C 1/10* (2013.01); *F02C 3/04* (2013.01); *F02C 7/08* (2013.01); *F02C 7/10* (2013.01); *F02K 3/06* (2013.01); *F25B 9/008* (2013.01); *F25B 9/06* (2013.01); *F05D 2220/32* (2013.01); *F05D 2240/35* (2013.01); *F05D 2260/213* (2013.01); *F25B 2309/061* (2013.01); *Y02T 50/675* (2013.01)

(56) References Cited

U.S. PATENT DOCUMENTS

| | | |
|---|---|---|
| 2013/0180259 A1 | 7/2013 | Stapp |
| 2014/0352317 A1* | 12/2014 | Loebig ............. F02C 7/143 |
| | | 60/772 |
| 2015/0240665 A1 | 8/2015 | Stapp |
| 2016/0053638 A1 | 2/2016 | Stapp |
| 2016/0084584 A1 | 3/2016 | Stapp |
| 2016/0096629 A1 | 4/2016 | Vaisman |

OTHER PUBLICATIONS

European Search Report, European Patent Application No. 17170539.5, dated Oct. 25, 2017, pp. 9, European Patent Office, The Hague Rijswijk, The Netherlands.

* cited by examiner

DEEP HEAT RECOVERY GAS TURBINE ENGINE

CROSS-REFERENCE TO RELATED APPLICATIONS

This application is a non-provisional application of, and claims priority under 35 USC § 119(e) to, U.S. provisional application 62/347,430, "DEEP HEAT RECOVERY GAS TURBINE ENGINE" filed Jun. 8, 2016, the entire contents of which are incorporated by reference.

TECHNICAL FIELD

This disclosure relates to gas turbine engines and, in particular, to a deep heat recovery system included in a gas turbine engine.

BACKGROUND

Gas turbine engines are used on vehicles such as airplane and helicopters. These engines are internal combustion engines that operate to produce thrust by discharging a high velocity exhaust. Some gas turbine engines can also include fan blades to create thrust.

Gas turbine engines include one or more compressors, a combustor and one or more turbines. Air is compressed in the compressor(s), mixed with fuel in the combustor and ignited, such that exhaust gases are created and discharged through a turbine to create thrust. The exhaust gas rotates the turbine, which is typically used to turn a shaft and produce shaft work output, such as to drive the compressor or a gearbox. There can be one or more turbines and corresponding shafts producing shaft work output. Systems within a gas turbine engine can use the shaft work output.

SUMMARY

An example of a gas turbine engine includes a system having a first heat exchanger coupled in series with a second heat exchanger in a flow path of a working fluid to sequentially transfer heat out of the working fluid. The working fluid may be super critical fluid, such as carbon dioxide ($CO_2$). The first heat exchanger may be configured to recuperatively transfer heat from the working fluid to a compressed air flow received from an air compressor of a gas turbine engine to reduce a temperature of the working fluid below a first threshold. The second heat exchanger may be configured to transfer heat from the working fluid to an ambient air flow to reduce the temperature of the working fluid from below the first threshold to below a second threshold. The system may also include a compressor. The compressor may be included in the flow path downstream of the second heat exchanger. The compressor may be configured to receive the working fluid below the second threshold and compress the working fluid to increase the temperature of the compressed working fluid above the second threshold. The system may also include a third heat exchanger included in the flow path following the compressor. The third heat exchanger may be configured to recuperatively transfer heat from an exhaust output gas of a combustor of the gas turbine engine, to the compressed working fluid to increase the temperature of the compressed working fluid above a third threshold, the third threshold being greater than the first threshold Another example of a gas turbine engine may include a system having an air compressor configured to compress a flow of intake air, a combustor configured to receive the compressed flow of intake air and provide exhaust output gas as thrust to an aircraft. The system may include a carbon dioxide ($CO_2$) compressor configured to compress a working fluid. The working fluid may be carbon dioxide. The system may further include a $CO_2$ expander coupled to the $CO_2$ compressor. The $CO_2$ expander configured to receive and expand the compressed working fluid to generate mechanical energy and output a decompressed working fluid. A temperature of the working fluid may be reduced as the compressed working fluid expands. The system may also include a compressed air heat exchanger positioned ahead of an inlet of the combustor and configured to recouperatively transfer heat from the decompressed working fluid to the compressed flow of intake air, and an output gas heat exchanger positioned after an outlet of the combustor and configured to recouperatively transfer heat from the exhaust output gas of the combustor to the compressed working fluid. The system may further include an ambient air heat exchanger positioned to receive an ambient air flow and transfer heat from the decompressed working fluid into the ambient airflow to lower a temperature of the decompressed working fluid to a transcritical mode.

Another example gas turbine may operate with a method that includes receiving a flow of working fluid at a first heat exchanger included in the gas turbine engine. The flow of working fluid may be carbon dioxide ($CO_2$). The method may also include transferring, in a recuperative cycle, heat from the flow of working fluid to a compressed air flow received from an air compressor of the gas turbine engine to reduce a temperature of the flow of working fluid below a first threshold. The method may also include receiving the flow of working fluid at a second heat exchanger that is included in the gas turbine engine and is coupled in series with the first heat exchanger, and the second heat exchanger transferring heat out of the flow of working fluid to an ambient air flow to reduce the temperature of the flow of working fluid from below the first threshold to below a second threshold. The method may also include compressing the flow of working fluid with a compressor to increase the temperature of the flow of working fluid from below the second threshold to above the second threshold.

An example of a gas turbine engine may include two circuits having thermal contact in two heat exchangers. A first circuit, may be an open circuit operating on air, which includes an air compressor, a compressed air heat exchanger, a combustor, an output gas heat exchanger, and an air turbine. A second circuit may be a closed circuit operating on a working fluid different from air. The working fluid may be a supercritical fluid, such as carbon dioxide ($CO_2$). The second circuit may include a compressor, such as a $CO_2$ compressor, the output gas heat exchanger, a turbine, such as a $CO_2$ turbine, the compressed air heat exchanger, and an ambient air heat exchanger.

The compressed air heat exchanger and the ambient air heat exchangers may be coupled in series in a flow path of a working fluid to sequentially transfer heat out of the working fluid. The ambient air heat exchanger may be positioned at the air compressor inlet and configured to transfer heat from the working fluid to an ambient air flow to reduce the temperature of the working fluid from below the first threshold to below a second threshold. The compressed air heat exchanger may be configured to recuperatively transfer heat from the working fluid to a compressed air flow received from the air compressor of the gas turbine engine to reduce a temperature of the working fluid below a first threshold. The air compressor may be configured to compress the air flow leaving the ambient air heat exchanger. The combustor may be configured to receive the compressed air flow and provide exhaust output gas as thrust to an aircraft. The compressor may be configured to receive the working fluid below the second threshold and compress the working fluid to increase the temperature of the compressed working fluid above the second threshold.

The output gas heat exchanger may be configured to recuperatively transfer heat from the exhaust output gas of the combustor to the compressed working fluid. The expander may be coupled to the compressor. The expander may be configured to receive and expand the compressed working fluid to generate mechanical energy and output a decompressed working fluid. A temperature of the working fluid may be reduced as the compressed working fluid expands.

The gas turbine may further include a working fluid heat exchanger configured to recuperatively transfer heat from the working fluid leaving the expander to the working fluid leaving the compressor.

Another example of the gas turbine may include a fan configured to receive air entering the gas turbine and generate two parallel streams: one stream for the air compressor and the other stream for the ambient air heat exchanger. The air compressor is positioned to receive the first air stream and configured to compress the air flow leaving the ambient air heat exchanger. The ambient air heat exchanger is positioned to receive the second air stream directed by the fan (such as a bypass air flow) and configured to transfer heat from the working fluid to an ambient air flow to reduce the temperature of the working fluid from below the first threshold to below a second threshold.

In one case the gas turbine may be configured to operate as a jet engine generating thrust by the air stream exiting the air turbine. Alternatively, the gas turbine may be configured to operate as a turbo-shaft and the turbine may be configured to generate power and transfer the generated power via a gear box. Alternatively the fan may be configured as a propeller and the gas turbine may be configured to operate as a turboprop. Alternatively, the fan may be configured to provide a bypass air stream and the gas turbine may be configured to operate as a turbofan.

Other systems, methods, features and advantages will be, or will become, apparent to one with skill in the art upon examination of the following figures and detailed description. It is intended that all such additional systems, methods, features and advantages be included within this description, be within the scope of the invention, and the following claims

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

A gas turbine engine may include two circuits: one open circuit operating on air and a second closed circuit operating on a working fluid different than air. The processes of the working fluid are above the critical pressure and the working fluid circuit implements a super-critical cycle. However, if the ambient temperature is low, the heat rejection process may be designed and controlled to operate below the critical pressure and the working fluid circuit may implement a trans-critical cycle. The above-described process uses a working fluid, such as carbon dioxide ($CO_2$), a carbon-dioxide mixture, or a fluid or a mixture that can operate as a super-critical and a transcritical working fluid. In the following discussion $CO_2$ is described as the working fluid in a deep heat recovery system, and, therefore, the related cycles are supercritical ($sCO_2$) or trans-critical ($tCO_2$) cycles. In other examples, the working fluid in the may be any other form of high pressure refrigerant having characteristics of heat absorption and heat rejection processes when used in a system where the working fluid is above the critical pressure (supercritical) and/or heat rejection processes when used below the critical pressure (trans-critical). Thus, the deep heat recovery system should not be construed as limited to $CO_2$ as a working fluid even though the following description may describe the working fluid as $CO_2$ for illustrative purposes.

The deep heat recovery system provides efficient rotational power generation to one or more shafts for use within the gas turbine engine due to the deep heat recovery that occurs during a cycle. During operation, the deep heat recovery system uses recuperation processes via multiple heat exchangers to optimize efficiency of overall operation of the gas turbine engine through integration of the deep heat recovery system within the propulsion (or air stream side) of the gas turbine engine.

A technical advantage of the systems and methods described below relates to the deep heat recovery system performing deep heat recovery using the same air flow stream used by the gas turbine engine for combustion to both extract and supply heat energy. Another related technical advantage of the systems and methods described below involves the strategic placement of a compressed air heat exchanger between the air compressor and the combustor to recuperatively transfer heat from the deep heat recovery system to the compressed air, followed by rejection of heat from the deep heat recovery system by strategic placement of an ambient air heat exchanger such that the working fluid, such as $CO_2$, of the deep heat recovery system may be cooled as much as possible. Since the intent is to cool the working fluid as much as possible, depending on the ambient air temperature the cycle may operate in either of the supercritical mode or the transcritical mode with increased overall efficiency of the gas turbine engine.

Figure 1:
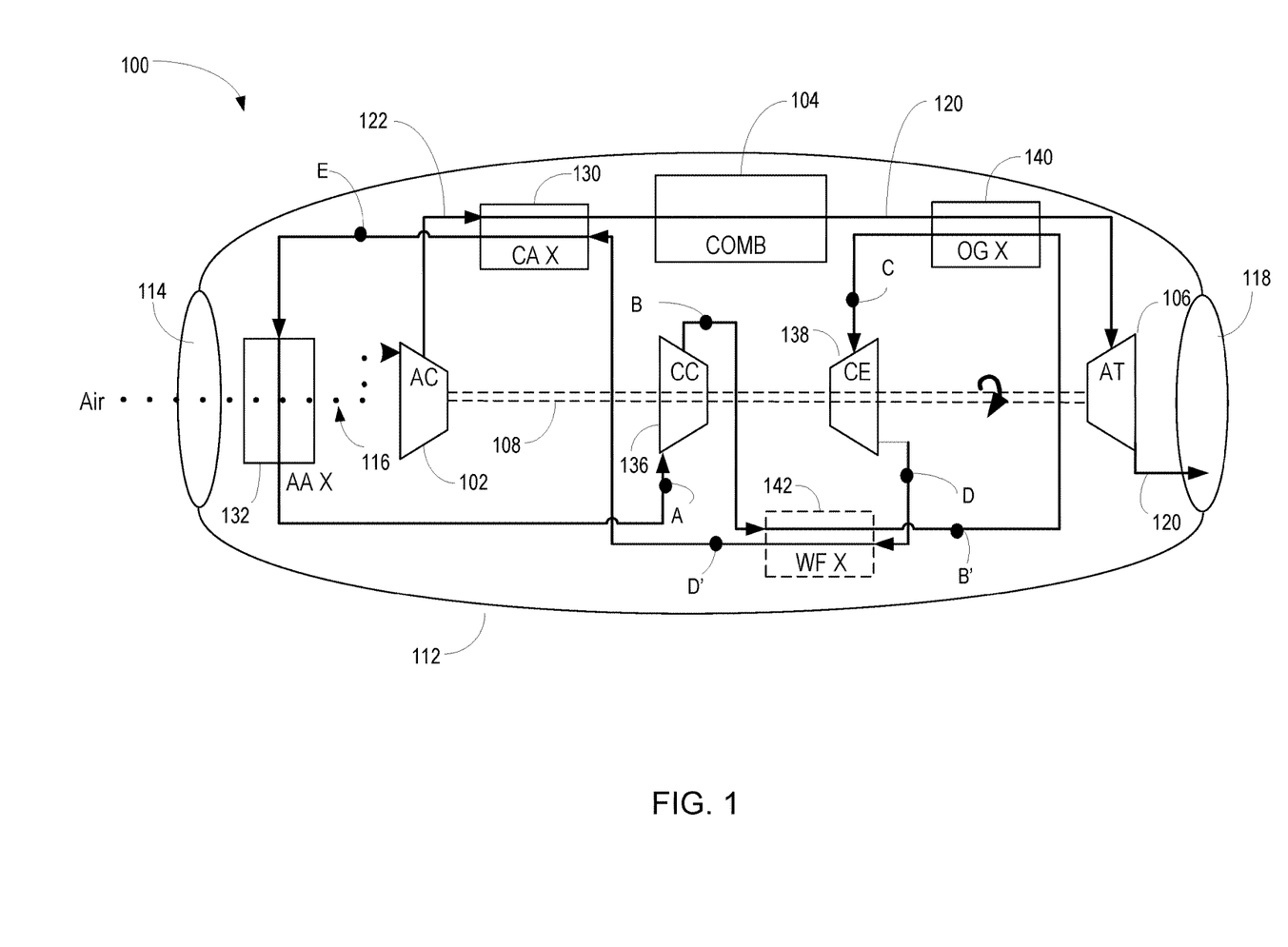
FIG. 1 illustrates a first example of a gas turbine engine that includes a deep heat recovery system.

FIG. 1 illustrates an example gas turbine engine that includes a deep heat recovery system 100. The gas turbine engine includes an air compressor 102 to provide compressed air to a combustor 104 where the compressed air is mixed with fuel and ignited. Exhaust gases from the combustor 104 are provided to a turbine 106 which rotates a shaft 108 to produce rotational energy or work. The rotational energy may be used to drive the compressor 102 and the deep heat recovery system 100, as well as other systems and processes. In FIG. 1, a single turbine 106 and shaft 108 are illustrated. In other examples, multiple different and independent turbines and/or shafts may be used, which may rotate at the same or different speeds.

The gas turbine engine includes an outer housing 112 having an inlet 114 for receipt of a flow of intake air, or ambient air 116, and an outlet 118 through which a flow of exhaust output gases 120 are expelled to provide thrust for the gas turbine engine mounted on a vehicle, such as an airplane or helicopter. Portions of the deep heat recovery system 100 are included in the air stream side of the gas turbine engine, which includes the flow of ambient air 116 received in the inlet 114 and provided to the compressor 102 as intake air, a flow of compressed air 122 provided by the compressor 102 to the combustor 104, and the flow of exhaust output gases 120 provided by the combustor 104 through the turbine 106 to the outlet 118.

The deep heat recovery system 100 may be a deep heat recover super critical carbon dioxide (sCO2) system that includes a first heat exchanger, which may be described as a compressed air heat exchanger (CA X) 130 operable as a CO2-to-air heat rejection exchanger. The compressed air heat exchanger 130 receives the flow of compressed air 122 output from the compressor 102 and transfers heat out of the flow of working fluid as part of a recuperative cycle to increase the temperature of the flow of compressed air 122. In addition, the deep heat recovery system 100 includes a second heat exchanger, which is an ambient air heat exchanger (AA X) 132 coupled in series with the compressed air heat exchanger 130 in the path of the flow of working fluid. The ambient air heat exchanger 132 is operable as a CO2-to-air heat rejection exchanger to reject heat from the working fluid 132 by transfer of heat to the ambient air flow. In the example configuration, ambient air flow heated with the ambient air heat exchanger 132 is received at the compressor 102. Thus, the deep heat recovery system 100 provides a two-stage process to recover or transfer heat from the flow of working fluid. The heat exchangers, as described herein may be any form of mechanism or device that provides transfer of heat energy between different fluids. Example heat exchangers include a plate heat exchanger, a micro/mini-channel heat exchanger, a printed circuit heat exchanger, a Marbond heat exchanger, and/or any other compact heat exchanger. The terms "first", "second", "third", etc., are used herein for understanding by the reader and should not be construed as an order or priority or any other form of limitation of the devices. In addition, in other examples, different ordering or nomenclature could be used to describe the respective devices.

The deep heat recovery system 100 also includes a compressor, or CO2 compressor 136, and an expander, or a CO2 expander 138. The compressor may be any form of mechanism or device capable of pressurizing the working fluid such that working fluid received at a lower pressure by the compressor is output at a higher pressure. Working fluid compressed by the CO2 compressor 136 is provided as compressed working fluid through a third heat exchanger, which is an output gas heat exchanger (OG X) 140, to the CO2 expander 138. The CO2 expander 138 is a turbine that extracts work from the working fluid in the form of mechanical shaft power by expanding the flow of working fluid to drop the pressure and raise the temperature of the flow of working fluid to output decompressed working fluid. The CO2 expander 138 may be any mechanism or device capable of extracting work from the compressed working fluid. In other examples, as discussed elsewhere, any number of CO2 expanders may be included in the deep heat recovery system 100. The output gas heat exchanger 140 recuperates heat from the flow of exhaust output gas 120 to the flow of compressed working fluid by operating as an air-to-CO2 heat rejection exchanger.

The deep heat recovery system 100 also includes a fourth heat exchanger, which is a working fluid heat exchanger (WF X) 142 to recuperate heat from the decompressed flow of working fluid to transfer to the compressed flow of working fluid output by the CO2 compressor 136. The working fluid heat exchanger 142 is a CO2-to-CO2 recuperative heat exchanger. In some examples, the working fluid heat exchanger 142 may be omitted, and is therefore illustrated with dotted lines.

Thus, the deep heat recovery system 100 may include a number of different fluid circuits. A first circuit may be considered an open circuit operating with air in which the components in the circuit are associated with a flow of air through (or around in the case of the bypass air) the gas turbine engine. The first circuit may include the air compressor 102, the compressed air heat exchanger 130, the combustor 104, the output gas heat exchanger 140 and the air turbine 106. A second circuit included in the deep heat recovery system 100 may be considered a closed circuit operating with the working fluid, such as CO2. The second circuit may include the fluid compressor 136, the expander 138, the output gas heat exchanger 140, the compressed air heat exchanger 130, and the ambient air heat exchanger 132. In examples that include the working fluid heat exchanger 142, the second circuit may also include the working fluid heat exchanger 142.

Figure 2:
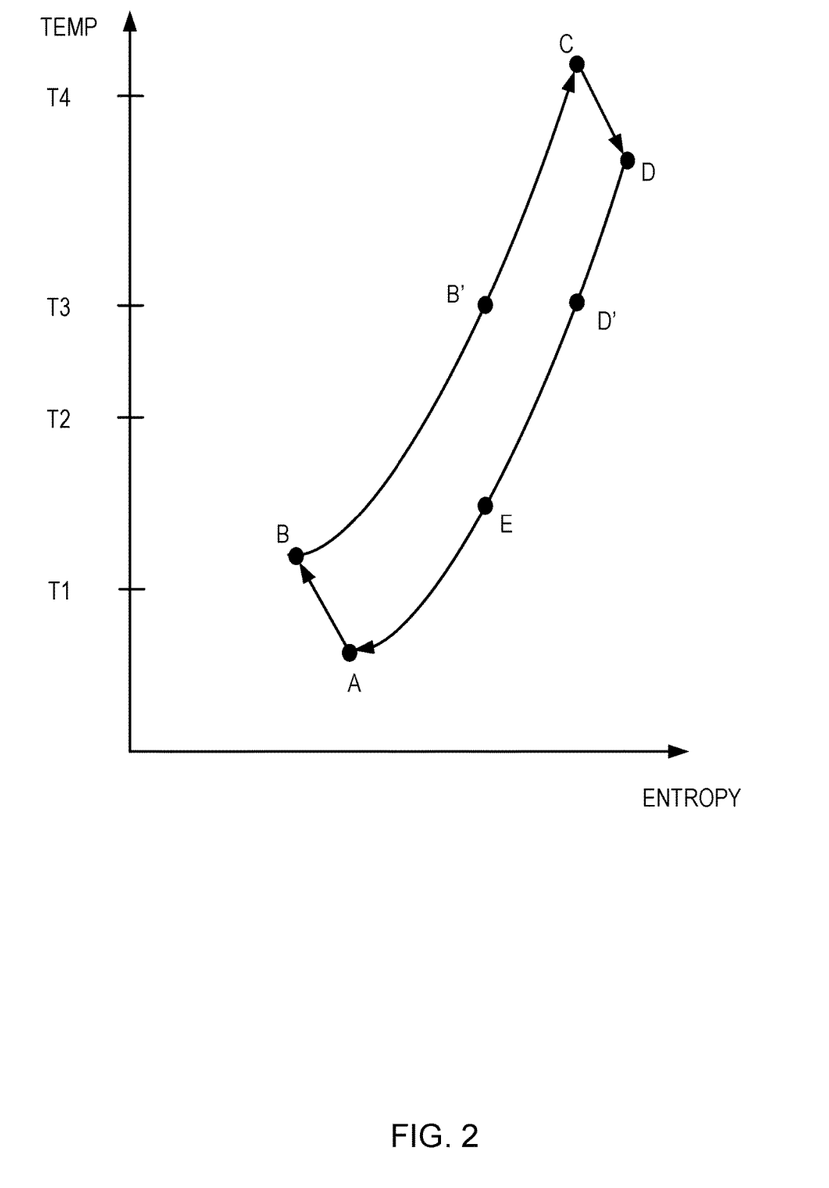
FIG. 2 illustrates an example of a thermodynamic cycle for the deep heat recovery system of FIG. 1.

FIG. 2 is an example of a thermodynamic cycle for the deep heat recovery deep heat recovery system 100 which will be described with reference to FIG. 1. The cycle illustrated in FIG. 2 will be described as beginning at point A in the flow path of the working fluid where a flow of working fluid is provided at an inlet to the CO2 compressor 136. (see FIG. 1) In other examples, the cycle may commence at any other point in the working fluid flow path. The CO2 compressor 136 uses work provided by rotation of the shaft 108 to compress the flow of working fluid and increase the temperature and pressure of the working fluid at point B at the outlet of the CO2 compressor 136, as illustrated in FIGS. 1 and 2.

In FIG. 2, the temperature of the flow of working fluid is increased from point A, which is below a temperature threshold value (T1) to point B, which is above the temperature threshold value (T1) by compression with the CO2 compressor 136. The deep heat recovery system 100 drives the temperature of the working fluid as low as possible at point A so as to maximize efficiency of the compressor 136 without regard to the critical temperature for supercritical mode. In other words, the critical temperature of CO2 is not a target to which the deep heat recovery system is controlling, instead, the working fluid is cooled as much as possible using the series of heat exchangers 130 and 132. Depending on the temperature of the ambient air flowing through the ambient air heat exchanger 132 and the corresponding temperature of the compressed air 122 provided to the compressed air heat exchanger 130, the heat rejection process provided by the heat exchangers 130 and 132 may occur at or below the CO2 critical pressure. The critical point for CO2 is at 7.36 MPa (1,067 psia) and 31 degrees Celsius (88 degrees Fahrenheit) such that the supercritical mode for CO2 occurs at or above the critical point. Below the critical point, the cycle is transcritical.

In a first example the cycle of the deep heat recover system is transcritical since the heat rejection process occurs below the critical pressure. In this first example, the temperature of the working fluid is cooled below the temperature threshold value (T1), where the temperature threshold value (T1) is 31 degrees Celsius. Thus, in this first example, the CO2 compressor 136 may operate with greater efficiency to compress the flow of working fluid due to the flow of working fluid being below the critical point when received by the compressor 136. In a second example, the cycle of deep heat recovery system is supercritical since the heat rejection process occurs above the critical pressure. In this second example, the temperature of the working fluid is cooled below the temperature threshold value (T1), where the temperature threshold value (T1) is higher such that at point A the temperature of the working fluid is above the critical temperature of 31 degrees Celsius. In this second example, the CO2 compressor 136 may still operate efficiently to compress the flow of working fluid, but with less efficiency than when the flow of working fluid is below the critical point at the time of receipt by the compressor 136. In either of the first or the second examples, recuperation of the heat using the air side of the gas turbine engine increases the efficiency using deep heat recovery to drive the temperature of working fluid to lower temperatures.

As illustrated in FIG. 1, point A occurs at the inlet to the CO2 compressor 136, and Point B occurs at the outlet of the CO2 compressor 136 when the flow of working fluid is compressed and the temperature has correspondingly increased above the threshold (T1). The compressed flow of working fluid flows through the outlet gas heat exchanger 140 where the temperature of the flow of working fluid is further increased above a threshold (T4) such that the working fluid is at a highest temperature at the inlet to the expander 138 at Point C. In examples of deep heat recovery systems 100 that include the working fluid heat exchanger 142, the temperature of the flow of working fluid may be increased above the threshold (T3) at Point B' prior to being further increased to Point C. Thus, in these example systems, the deep heat recovery system includes two stage recuperative heating of the working fluid via the outlet gas heat exchanger 140 and the working fluid heat exchanger 142. The decrease in temperature below the threshold (T4) occurs at the time the working fluid is decompressed by the expander 138 at Point D. The decompressed flow of working fluid is provided to the compressed air heat exchanger where heat from the working fluid is transferred to compressed air supplied by the compressor 102 at Point E. This first stage of cooling of the working fluid results in a reduction in temperature below the threshold (T2), which may be considered a first threshold of the two stage cooling. In examples of deep heat recovery systems 100 that include the working fluid heat exchanger 142, the temperature of the flow of working fluid may be decreased during the second stage below the threshold (T2) at Point D' prior to being further decreased in temperature at Point E.

The flow of working fluid is then further cooled in a second cooling stage by the ambient air heat exchanger 132 to decrease the temperature below the threshold T1, which may be considered a second threshold of the two stage cooling. The magnitude of reduction in temperature below the threshold T1 is dependent on ambient conditions due to the heat from the working fluid being rejected to compressed ambient air by the compressed air heat exchanger 130 during the first cooling stage, and subsequently being rejected to ambient air by the ambient air heat exchanger 132 during the second cooling stage. The cooperative combination of the first cooling stage and the second cooling stage achieves a lower temperature of the working fluid than is otherwise possible while also providing a recuperative cycle of heat transfer.

Figure 3:
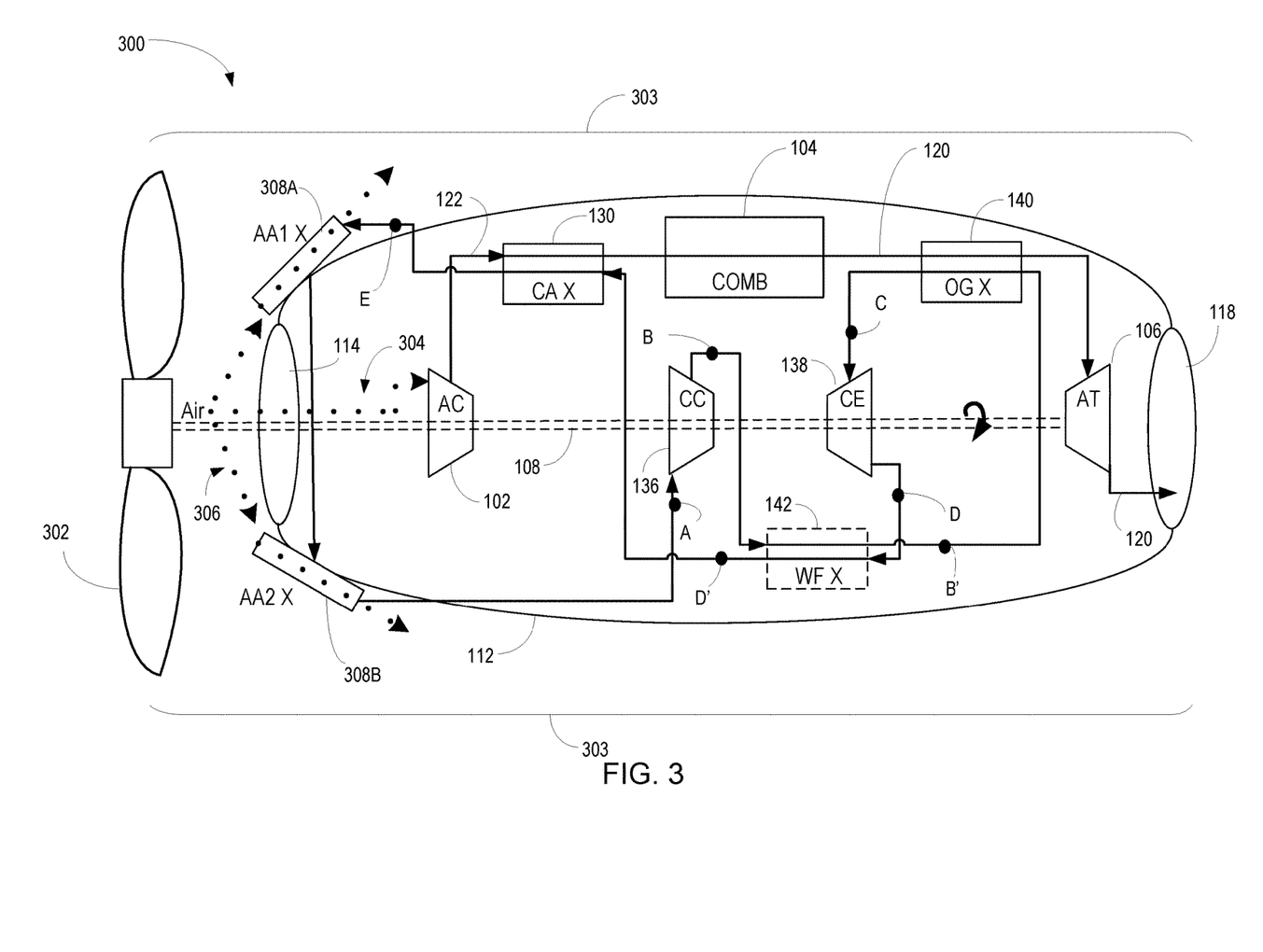
FIG. 3 illustrates a second example of a gas turbine engine that includes a deep heat recovery system.

FIG. 3 illustrates a second example of a gas turbine engine that includes a deep heat recovery system 300. In this example, the gas turbine engine is a turbofan gas turbine engine that includes a fan 302 (or propeller) within an outer bypass duct 303 surrounding the housing 112. The fan 302 is rotated by the shaft 108 which is driven by the turbine 106 to create thrust for a vehicle such as a plane or helicopter upon which the gas turbine engine is mounted. For purposes of brevity, the discussion focuses on differences with the other discussed gas turbine engines related to the deep heat recovery system 300. Accordingly, the discussed features and functionality of other example systems are applicable unless otherwise noted.

In FIG. 3, a flow of ambient air includes a core air stream 304 that flows through the inlet 114 for receipt and compression by the compressor 102. The compressed flow of air is heated in the compressed air heat exchanger 130, by recuperative cooling of the working fluid in a first cooling stage, and is then provided to the combustor 104. Exhaust output gases 120 are channeled through the turbine 106 to the outlet 118 to create thrust. In addition, the flow of ambient air includes a bypass air stream 306 that flows within the outer bypass duct 303 around the housing 112 and also creates thrust. At least a portion of the bypass airstream 306 flowing in the outer bypass duct 303 flows through ambient air heat exchangers 308 positioned external to the housing 112 of the gas turbine engine. The ambient air heat exchangers 308 are CO2-to-air heat rejection exchangers that provide a second stage of cooling of the flow of working fluid in the deep heat recovery system 300. In FIG. 3, two ambient air heat exchangers 308A and 308B are illustrated, however, in other examples additional or fewer ambient air heat exchangers 308 may be mounted on the housing 112. The thermodynamic cycle of the deep heat recovery system 300 is illustrated in FIG. 2. Accordingly, depending on ambient conditions, the heat rejection cycle of Points D, E and A may occur above critical pressure as a supercritical cycle, or below critical pressure as a transcritical cycle.

Figure 4:
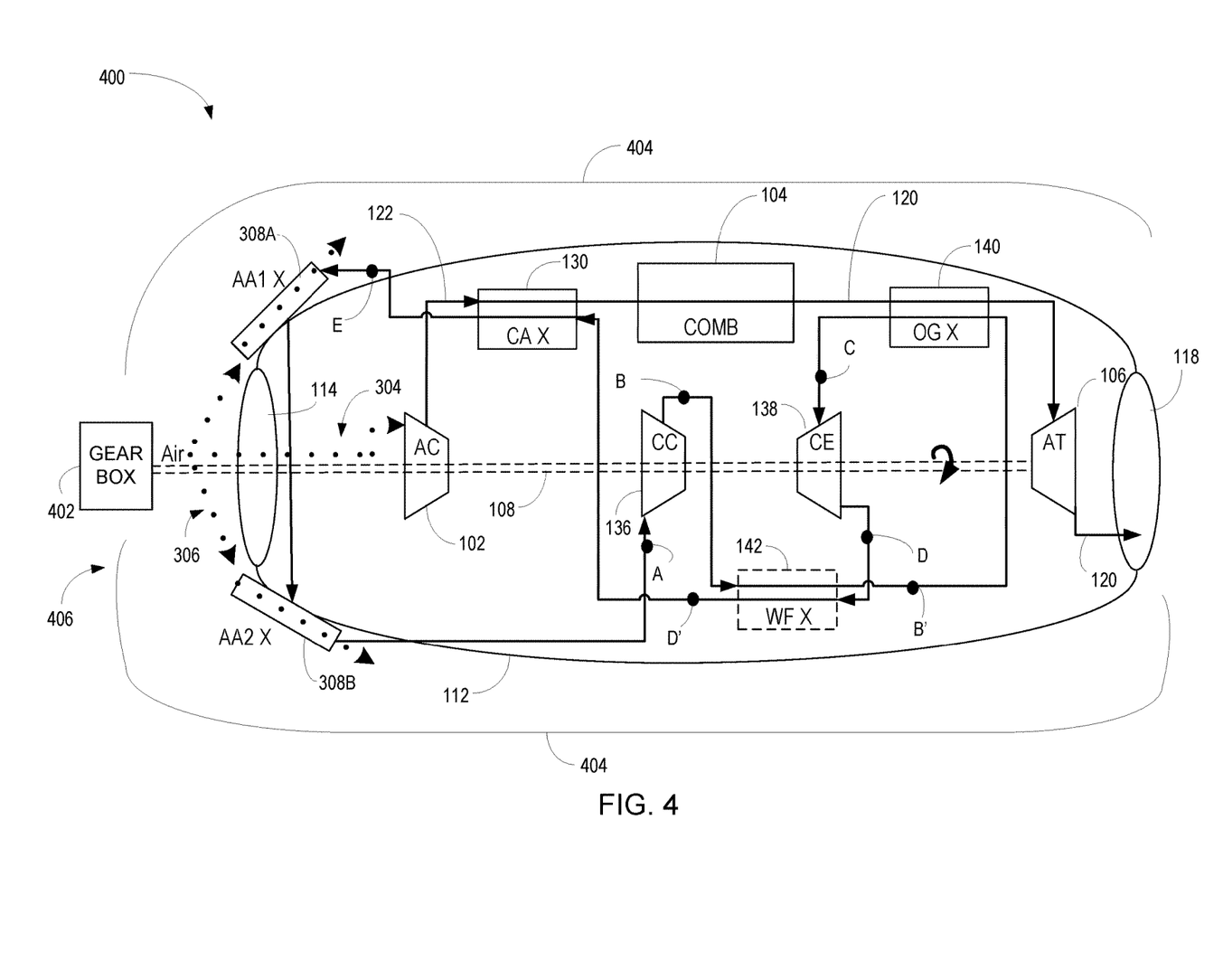
FIG. 4 illustrates a third example of a gas turbine engine that includes a deep heat recovery system.

FIG. 4. illustrates a third example of a gas turbine engine that includes a deep heat recovery system 400. In this example, the gas turbine engine is a turbo shaft or a turbo-prop gas turbine engine that includes a gear box 402 and a nacelle 404 surrounding the housing 112. The gear box 402 may be rotated by the shaft 108 which is driven by the turbine 106. The gear box 402 may provide a source of drive power for the purpose of creating thrust for a vehicle such as a plane or helicopter upon which the gas turbine engine is mounted. The gear box 402 may therefore drive a fan (not shown) to provide the core air stream 304 and the bypass air stream 306. The bypass air stream 306 may enter the nacelle 404 via a scoop 406 formed as part of the nacelle 404. For purposes of brevity, the discussion will focus on differences with the other discussed gas turbine engines related to the deep heat recovery system 400. Accordingly, the discussed features and functionality of other example systems are applicable unless otherwise noted.

Although the ambient air heat exchanger(s) 308 are illustrated as mounted on the housing 112 as 308A and 308B within the nacelle 404, the positioning of the ambient air heat exchanger(s) 308 in other examples may be any location that can utilize a stream or flow of ambient air provided by a fan driven by the gear box 402 to reject heat from the flow of working fluid.

Figure 5:
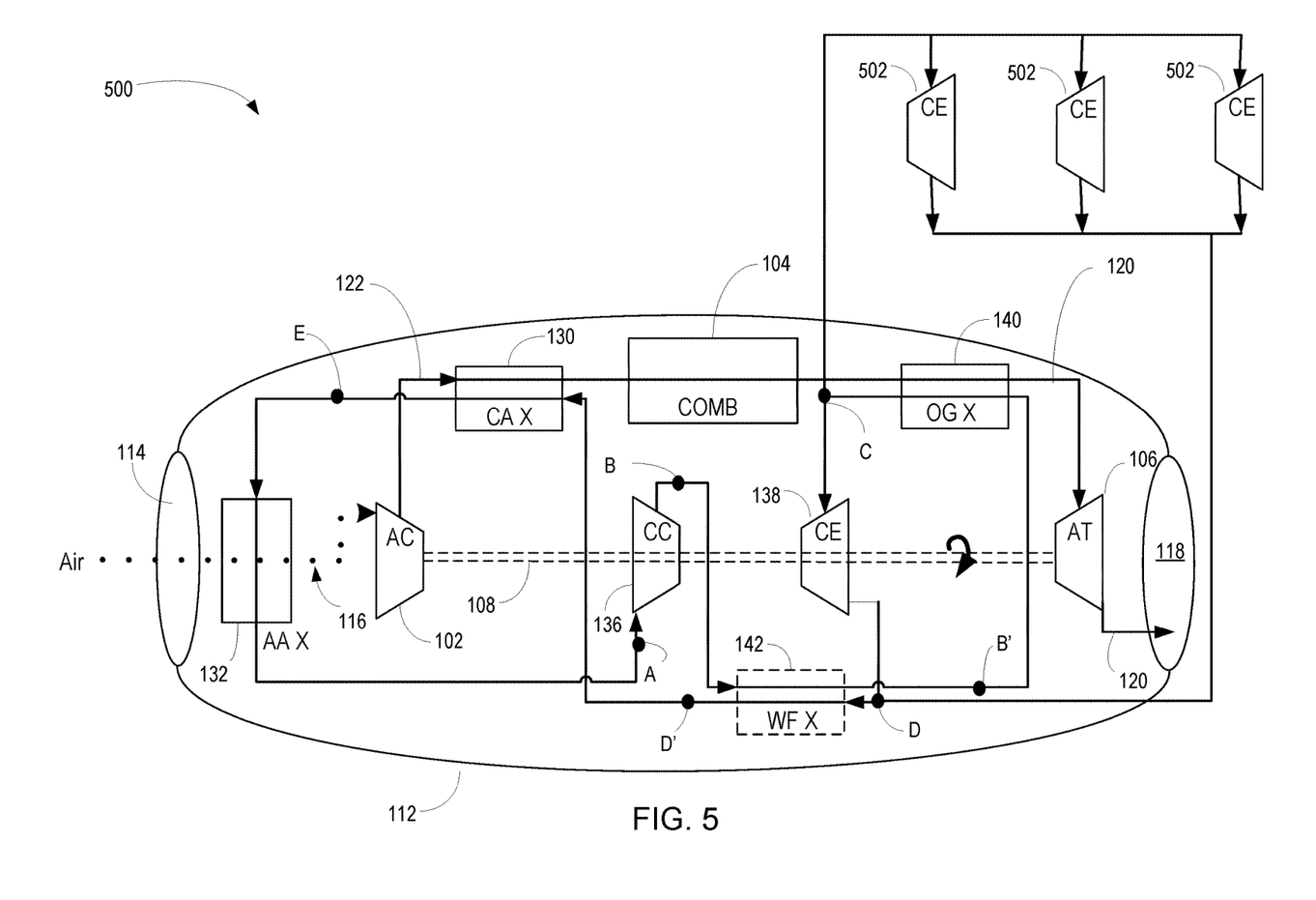
FIG. 5 illustrates a fourth example of a gas turbine engine that includes a deep heat recovery system.

FIG. 5 illustrates a fourth example of a gas turbine engine that includes a deep heat recovery system 500. The gas turbine engine of this example is illustrated as similar to FIG. 1, however, in other examples, gas turbine engines similar to FIG. 3 or 4 are also possible. For purposes of brevity, the discussion will focus on differences with the other discussed gas turbine engines related to the deep heat recovery system 500. Accordingly, the discussed features and functionality of other example systems are applicable unless otherwise noted.

The deep heat recovery system 500 includes a plurality of expanders 502, which may be distributed throughout a vehicle such as an airplane or helicopter to provide sources of power. In this example, each of the expanders 502 may have an output shaft and/or a gear box to independently provide shaft power for systems in the vehicle such as pumps for hydraulic systems, generators for electrical systems, motors for mechanical systems, or any other functionality.

As shown in FIG. 5, the expanders 502 may be coupled in parallel to receive the compressed flow of working fluid at Point C after heat from the exhaust output gas has been transferred thereto. The expanders 502 may be turbines that are independently controlled by valves to be independently activated and deactivated to be driven with the compressed working fluid. Each of the expanders 502 when activated may decompress the working fluid and provide decompressed working fluid at Point D.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

The subject-matter of the disclosure relates, among others, to the following aspects:

1. A system comprising:
a first heat exchanger coupled in series with a second heat exchanger in a flow path of a working fluid to sequentially transfer heat out of the working fluid, the working fluid being a supercritical fluid;
the first heat exchanger configured to recuperatively transfer heat from the working fluid to a compressed air flow received from an air compressor of a gas turbine engine to reduce a temperature of the working fluid below a first threshold, and the second heat exchanger configured to transfer heat from the working fluid to an ambient air flow to reduce the temperature of the working fluid from below the first threshold to below a second threshold;
a compressor included in the flow path downstream of the second heat exchanger, the compressor configured to receive the working fluid below the second threshold and compress the working fluid to increase the temperature of the compressed working fluid above the second threshold; and
a third heat exchanger included in the flow path following the compressor, the third heat exchanger configured to recuperatively transfer heat from an exhaust output gas of a combustor of the gas turbine engine, to the compressed working fluid to increase the temperature of the compressed working fluid above a third threshold, the third threshold being greater than the first threshold.

2. The system of claim 1, wherein the compressed air flow recuperatively heated by the first heat exchanger is provided to the combustor, the combustor configured to receive the compressed air flow recuperatively heated by the first heat exchanger and provide thrust for the gas turbine engine.

3. The system of claims 1 or 2, wherein, the working fluid is carbon dioxide ($CO_2$).

4. The system as in any of of claims 1-3, further comprising an expander included in the flow path between the first heat exchanger and the third heat exchanger, the expander configured to receive and decompress the compressed working fluid received from the third heat exchanger and to output the decompressed working fluid for receipt by the first heat exchanger as the working fluid.

5. The system as in any of claims 1-4, further comprising a fourth heat exchanger coupled in the flow path between the expander and the first heat exchanger, and between the compressor and third heat exchanger, the fourth heat exchanger configured to recuperatively transfer heat from the decompressed working fluid output by the expander to the compressed working fluid output by the compressor.

6. The system as in any of claims 1-5, wherein the ambient air flow to which the second heat exchanger transfers heat is channeled to the air compressor of the gas turbine engine.

7. The system as in any of claims 1-5, wherein the gas turbine engine is a turboprop gas turbine engine and the ambient air flow to which the second heat exchanger transfers heat is a bypass stream directed around the gas turbine engine to create thrust.

8. The system as in any of claims 1-7, wherein the first threshold is a temperature at or above a critical point of $CO_2$, and the second threshold temperature is below a critical point of $CO_2$.

9. A system comprising:
an air compressor configured to compress a flow of intake air;
a combustor configured to receive the compressed flow of intake air and provide exhaust output gas as thrust to an aircraft;
a fluid compressor configured to compress a working fluid, the working fluid being a supercritical fluid;
an expander coupled to the fluid compressor and configured to receive and expand the compressed working fluid to generate mechanical energy and output a decompressed working fluid, wherein a temperature of the working fluid is reduced as the compressed working fluid expands;
a compressed air heat exchanger positioned ahead of an inlet of the combustor and configured to recuperatively transfer heat from the decompressed working fluid to the compressed flow of intake air;
an output gas heat exchanger positioned after an outlet of the combustor and configured to recuperatively transfer heat from the exhaust output gas of the combustor to the compressed working fluid; and an ambient air heat exchanger positioned to receive an ambient air flow and transfer heat from the decompressed working fluid into the ambient airflow to lower a temperature of the decompressed working fluid to a transcritical mode.

10. The system of claim 9, further comprising a working fluid heat exchanger positioned between the expander and the fluid compressor and configured to recouperatively transfer heat from the decompressed working fluid to the compressed working fluid.

11. The system as in claims 9 or 10, wherein at least two of the fluid compressor, the expander, or the air compressor are configured to rotate on separate and independent shafts.

12. The system as in any of claims 9-11, wherein the ambient air heat exchanger is a recuperative heat exchanger, and the ambient air flow heated by the ambient air heat exchanger comprises at least part of the flow of intake air provided to the fluid compressor.

13. The system as in any of claims 9-11, wherein the ambient air heat exchanger is a heat rejection heat exchanger, and the ambient air flow heated by the ambient air heat exchanger is a bypass air stream.

14. The system as in any of claims 9-13, wherein the fluid compressor, the expander, and the air compressor are all rotatably coupled to a single common shaft.

15. The system of claim 14, wherein the single common shaft is coupled with a fan.

16. The system of claim 14, wherein the single common shaft is coupled with a gear box.

17. A method comprising:
receiving a flow of working fluid at a first heat exchanger included in a gas turbine engine, the flow of working fluid being a supercritical fluid;
transferring, in a recuperative cycle, heat from the flow of working fluid to a compressed air flow received from an air compressor of the gas turbine engine to reduce a temperature of the flow of working fluid below a first threshold;
receiving the flow of working fluid at a second heat exchanger that is included in the gas turbine engine and is coupled in series with the first heat exchanger, the second heat exchanger transferring heat out of the flow of working fluid to an ambient air flow to reduce the temperature of the flow of working fluid from below the first threshold to below a second threshold; and
compressing the working fluid with a compressor to increase the temperature of the working fluid from below the second threshold to above the second threshold.

18. The method of claim 17, wherein transferring heat out of the flow of working fluid to the ambient air flow to reduce the temperature of the flow of working fluid from below the first threshold to below the second threshold comprises reducing the temperature of the working fluid below a critical point and performing a heat rejection cycle in a transcritical mode.

19. The method of claim 18, wherein transferring heat out of the flow of working fluid to the ambient air flow to reduce the temperature of the flow of working fluid from below the first threshold to below the second threshold comprises reducing the temperature of the working fluid to be above a critical point and performing a heat rejection cycle in a supercritical mode.

20. The method as in any of claims 17-19, wherein receiving the flow of working fluid at the first heat exchanger comprises receiving the flow of working fluid as a decompressed flow of working fluid output by an expander, the expander decompressing the flow of working fluid following compression of the flow of working fluid by the compressor.

We claim:
1. A method comprising:
receiving a flow of a working fluid at a first heat exchanger of a gas turbine engine, the working fluid being a supercritical fluid;
transferring, in the first heat exchanger, heat from the flow of the working fluid to a compressed air flow received from an air compressor of the gas turbine engine to reduce a temperature of the flow of the working fluid below a first threshold, the air compressor being fluidly coupled with a combustor of the gas turbine engine;
receiving the flow of the working fluid from the first heat exchanger at a second heat exchanger of the gas turbine engine, the second heat exchanger being coupled in series with the first heat exchanger, the second heat exchanger transferring heat out of the flow of the working fluid to an ambient air flow to reduce the temperature of the flow of the working fluid from below the first threshold to below a second threshold;
receiving the flow of the working fluid from the second heat exchanger at a fluid compressor and compressing the flow of the working fluid with the fluid compressor to increase the temperature of the flow of the working fluid from below the second threshold to above the second threshold; and
receiving the compressed flow of the working fluid from the fluid compressor at a third heat exchanger, the third heat exchanger transferring heat from an exhaust output gas produced by the combustor to the compressed flow of the working fluid.

2. The method of claim 1, wherein transferring heat out of the flow of the working fluid to the ambient air flow to reduce the temperature of the flow of the working fluid from below the first threshold to below the second threshold comprises reducing the temperature of the flow of the working fluid below a critical point and performing heat rejection in a transcritical mode of the working fluid.

3. The method of claim 1, wherein transferring heat out of the flow of the working fluid to the ambient air flow to reduce the temperature of the flow of the working fluid from below the first threshold to below the second threshold comprises reducing the temperature of the flow of the working fluid to be above the critical point and performing heat rejection in a supercritical mode of the working fluid.

4. The method of claim 1, wherein receiving the flow of the working fluid at the first heat exchanger comprises receiving the flow of the working fluid as a decompressed flow of working fluid output by an expander, the expander decompressing the flow of the working fluid following compression of the flow of working fluid by the fluid compressor.

5. A system comprising:
an air compressor configured to compress a flow of intake air;
a combustor configured to receive the compressed flow of intake air and provide exhaust output gas to produce thrust for an aircraft;
a fluid compressor configured to compress a working fluid, the working fluid being carbon dioxide;
an expander coupled to the fluid compressor and configured to receive and expand the compressed working fluid to generate mechanical energy and output a decompressed working fluid, wherein a temperature of the working fluid is reduced as the compressed working fluid expands;

a compressed air heat exchanger positioned ahead of an inlet of the combustor and configured to recuperatively transfer heat from the decompressed working fluid to the compressed flow of intake air;

an exhaust output gas heat exchanger positioned after an outlet of the combustor and configured to recuperatively transfer heat from the exhaust output gas of the combustor to the compressed working fluid; and an ambient air heat exchanger positioned to receive an ambient air flow and transfer heat from the decompressed working fluid into the ambient air flow to lower a temperature of the decompressed working fluid to within a temperature range of a transcritical mode of the working fluid.

6. The system of claim 5, further comprising a working fluid heat exchanger positioned between the expander and the fluid compressor and configured to recuperatively transfer heat from the decompressed working fluid to the compressed working fluid.

7. The system of claim 5, wherein at least two of the fluid compressor, the expander, or the air compressor are configured to rotate on respective separate and independent shafts.

8. The system of claim 5, wherein the ambient air heat exchanger is a recuperative heat exchanger, and the ambient air flow heated by the ambient air heat exchanger comprises at least part of the flow of intake air provided to the air compressor.

9. The system of claim 5, wherein the ambient air heat exchanger is a heat rejection heat exchanger, and the ambient air flow heated by the ambient air heat exchanger is a bypass air stream.

10. The system of claim 5, wherein the fluid compressor, the expander, and the air compressor are all rotatably coupled to a single common shaft.

11. The system of claim 10, wherein the single common shaft is coupled with a fan.

12. The system of claim 10, wherein the single common shaft is coupled with a gear box.

13. A system comprising:
a gas turbine engine comprising an air compressor fluidly coupled with a combustor, wherein the combustor is configured to provide an exhaust output gas;
a first heat exchanger coupled in series with a second heat exchanger in a flow path of a working fluid to sequentially transfer heat out of the working fluid, the working fluid being a supercritical fluid;
the first heat exchanger configured to recuperatively transfer heat from the working fluid to a compressed air flow received from the air compressor to reduce a temperature of the working fluid below a first threshold, and the second heat exchanger configured to transfer heat from the working fluid to an ambient air flow to reduce the temperature of the working fluid from below the first threshold to below a second threshold;
a compressor included in the flow path downstream of the second heat exchanger, the compressor configured to receive the working fluid below the second threshold and compress the working fluid to increase the temperature of the compressed working fluid above the second threshold; and
a third heat exchanger included in the flow path following the compressor, the third heat exchanger configured to recuperatively transfer heat from the exhaust output gas of the combustor to the compressed working fluid to increase the temperature of the compressed working fluid above a third threshold, the third threshold being greater than the first threshold.

14. The system of claim 13, wherein the compressed air flow recuperatively heated by the first heat exchanger is provided to the combustor, the combustor configured to receive the compressed air flow recuperatively heated by the first heat exchanger and provide thrust for the gas turbine engine.

15. The system of claim 13, wherein, the working fluid is carbon dioxide.

16. The system of claim 13, further comprising an expander included in the flow path between the first heat exchanger and the third heat exchanger, the expander configured to receive and decompress the compressed working fluid received from the third heat exchanger and to output decompressed working fluid for receipt by the first heat exchanger as the working fluid.

17. The system of claim 13, further comprising a fourth heat exchanger coupled in the flow path between the expander and the first heat exchanger, and between the compressor and third heat exchanger, the fourth heat exchanger configured to recuperatively transfer heat from the decompressed working fluid output by the expander to the compressed working fluid output by the compressor.

18. The system of claim 13, wherein the ambient air flow to which the second heat exchanger transfers heat is channeled to the air compressor of the gas turbine engine.

19. The system of claim 13, wherein the gas turbine engine is a turboprop gas turbine engine and the ambient air flow to which the second heat exchanger transfers heat is a bypass stream directed around the gas turbine engine to create thrust.

20. The system of claim 13, wherein the first threshold is a temperature at or above a critical point of carbon dioxide ($CO_2$), and the second threshold is a temperature below the critical point of $CO_2$.

* * * * *